Jan. 5, 1937.  W. J. DE WITT  2,066,458

FISH LURE

Filed May 22, 1935

Inventor
William J. DeWitt
by Roberts, Cushman & Woodbury
Att'ys.

Patented Jan. 5, 1937

2,066,458

UNITED STATES PATENT OFFICE 2,066,458

FISH LURE

William J. De Witt, Auburn, N. Y., assignor to Shoe Form Co., Inc., Auburn, N. Y., a corporation of New York Application May 22, 1935, Serial No. 22,805

2 Claims. (Cl. 43—46)

This invention relates to an improvement in a fish lure and more particularly in a lure embodying further developments of the structure disclosed in my copending application Serial No. 750,660, filed October 30, 1934, now Patent No. 2,008,437, dated July 16, 1935.

The primary object of this invention is to provide a fish lure having a hollow body made up of upper and lower concave sections and a partition between said sections and forming therewith two separate compartments and a frame through one of said compartments to which frame are secured the lead line and one or more hooks.

A further object of this invention is to provide a fish lure having a hollow body and simulating a minnow or other small fish, and including a concave or flattened area of the upper surface at the head of the lure which will, when relative motion between the lure and water is set up, impart to the lure a tendency to dive below the surface of the water.

Figure 1:
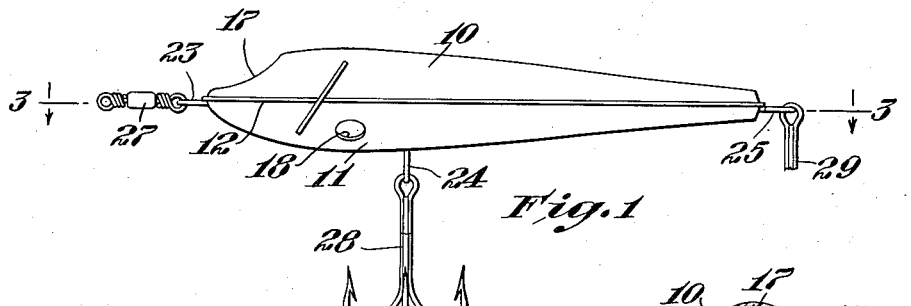
Figure 5:
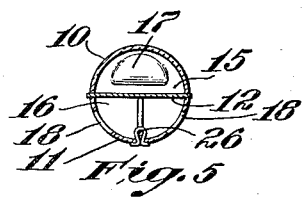
Figure 2:
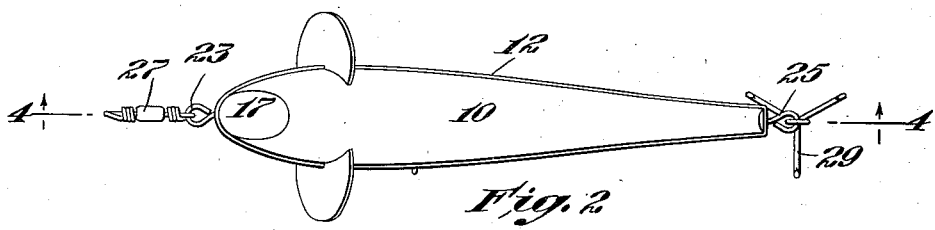
Figure 3:
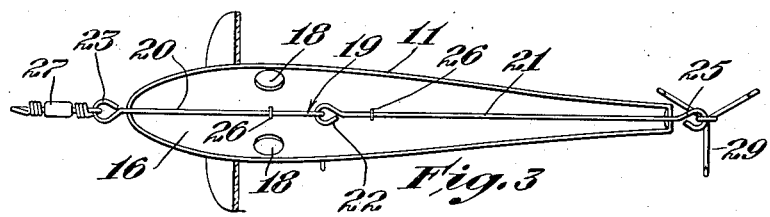
Figure 4:
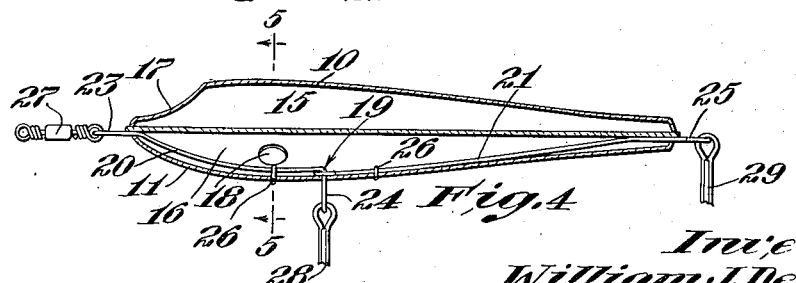

These and other objects will appear from a consideration of the following description and of the drawing which forms a part thereof and in which Fig. 1 is a side elevation of a fish lure embodying this inventon;

Fig. 2 is a plan view thereof;

Figs. 3 and 4 are longitudinal sections taken along the lines 3—3 on Fig. 1, and 4—4 on Fig. 2 respectively; and Fig. 5 is a cross section of the body of the lure taken substantially at the plane indicated by the line 5—5 on Fig. 4.

The fish lure shown in the drawing has the semblance or appearance of a minnow and has a hollow body made from celluloid or other light formable material. The body is made up of two concave sections, an upper section 10 and a lower section 11, and a partition 12. The partition coacts with the sections to form upper and lower compartments designated respectively by the numerals 15 and 16. The edge of the partition preferably projects beyond the surface defined by the sections and provides a definite ridge as shown particularly in Fig. 5.

The upper compartment 15 is preferably sealed so that the air therein imparts buoyancy to the lure in the water. The surface of the section 10 at the head of the lure is provided with a flattened area 17 which, as shown particularly in Figs. 1 and 4, extends downwardly and forwardly and gives the lure a tendency to dive when relative motion is set up between the lure and the water.

The lower compartment 16 is provided with one or more openings 18 in the wall of the section 11 through which water may flow into the compartment. Mounted in this compartment is a frame 19 consisting, in this embodiment, of wires 20 and 21, the former wire having an angular portion which passes through a loop 22 in the latter wire. The ends of the wire 20 project beyond the head and belly of the lure in loops 23 and 24 and one end of the wire 21 projects beyond the tail of the lure in a loop 25. The frame is secured to the section 11 by staples 26 and to it are connected the lead line, not shown, through a coupler 27 at the loop 23 and the hooks 28 and 29 at the loops 24 and 25 respectively. The apertures in the section 11 through which the ends of the wires pass may be sealed or, since the compartment 16 is open to the water through the openings 18, may be left unsealed if desired. The strain of a fish caught on the hooks is thus transmitted through the frame 19 to the lead line, from the hook 28 through the wire 20 and from the hook 29 through the wires 21 and 20.

While one embodiment only has been shown and described it will be understood that I am not limited thereto and that other embodiments may be made without departing from the spirit and scope of the invention as set forth in the following claims.

I claim:

1. A fish lure comprising a hollow body simulating a minnow or other small fish and consisting of an upper concave section, a lower concave section and a partition forming with said sections upper and lower compartments and a frame within said lower compartment and secured to the section wall thereof said frame providing a loop at the mouth of the lure for receiving a lead line and loops at the belly and tail of the lure for receiving hooks.

2. A fish lure comprising a hollow body simulating a minnow or other small fish and consisting of an upper concave section, a lower concave section and a partition forming with said sections upper and lower compartments and a frame within said lower compartment and consisting of two wires independently secured to the section wall thereof, the ends of one wire extending through the mouth and belly and terminating in loops for receiving the lead line and a hook, one end of the other wire extending through the tail and terminating in a loop for receiving a hook, and the other end being connected to the first wire.

WILLIAM J. DE WITT.